Dec. 27, 1966   A. H. BEAUFRERE ETAL   3,294,156
ROTARY REGENERATOR

Filed Jan. 21, 1965   7 Sheets-Sheet 1

Fig. 1.

INVENTORS
ALBERT H. BEAUFRERE
LLOYD E. JOHNSON
BY
Fryer and Zimwold
ATTORNEYS Dec. 27, 1966 A. H. BEAUFRERE ETAL 3,294,156
ROTARY REGENERATOR
Filed Jan. 21, 1965 7 Sheets-Sheet 7

Fig. 11.

INVENTORS
ALBERT H. BEAUFRERE
LLOYD E. JOHNSON
BY

ATTORNEYS

United States Patent Office 3,294,156
Patented Dec. 27, 1966

3,294,156
ROTARY REGENERATOR
Albert H. Beaufrere, Huntington, N.Y., and Lloyd E. Johnson, East Peoria, Ill., assignors to Caterpillar Tractor Co., Peoria, Ill., a corporation of California
Filed Jan. 21, 1965, Ser. No. 426,758
9 Claims. (Cl. 165—9)

The present invention relates to rotary regenerators and more particularly to improvements in rotary regenerators used in conjunction with gas turbine engines.

Rotary regenerators employed in conjunction with gas turbine engines generally include a housing which is separated into two compartments and a drum which is mounted for rotation in the housing. The rotating drum is disposed partially within one of the housing compartments and partially within the other such that portions of the drum are constantly emerging from one compartment and entering the other while the drum rotates. One of the compartments receives relatively low pressure, high temperature exhaust gases from the turbine engine while the other compartment receives relatively high pressure, low temperature compressor discharge air. Thus, the hot exhaust gases heat up the portion of the drum within one compartment while the portion of the drum in the other compartment transfers heat to the air in that compartment.

In order for a rotary regenerator to be a useful addition to a gas turbine engine it must operate efficiently and without the need of frequent maintenance. Three components of rotary regenerators are well known to be contributors of inefficiency or malfunction. These components include the rotating drum, support means for the rotating drum, and seals for maintaining effective separation between the two housing compartments.

The extreme thermal conditions which are experienced by the regenerator drum make it most difficult to provide a drum which will work efficiently over extended periods of time. Rotary regenerator drums are generally rectangular in cross section and constructed in such a manner as to enable exhaust gas to flow through the drum by entering its inner surface and passing to the exterior of the drum. Thus, in that compartment of the drum where heat is provided, exhaust gases are directed onto the inner surface of the drum from which they pass through the drum and out of the housing through an exhaust passage. When the exhaust gases contact the innermost surface of the drum they are much hotter than when they reach the outer portions of the drum. Thus a thermal gradient is established along a generally radial direction. When the drum passes out of the heating compartment it is exposed to relatively cold air which drops the temperature of the drum causing the drum to experience a rather larger thermal change. As the drum continues through the cooling compartment it once again enters the heating compartment and again experiences the relatively high temperatures which are established within the heating compartment. Thus, it is seen that the drum must be constructed in such a manner as to provide for expansion and contraction both overall and directionally. Furthermore, the drum must be constructed with sufficient compactness to make each revolution of the drum as efficient as possible in carrying heat from one compartment to the other.

When the two housing compartments are related to one another with the low pressure compartment adjacent to the high pressure compartment, as in the present invention, there is a difference between the static and dynamic forces which the drum mounting means experiences. Under dynamic conditions the high pressure in the smaller compartment produces an overall force upwardly as this arrangement is pictured which the drum mounting means must compensate for. Under static conditions the mounting means must be able to support the normal weight of the drum.

The sealing means of a rotary regenerator must effectively separate the two compartments to prevent the leakage of the high pressure air directly to the exhaust ducts without doing useful work in the turbine, and at the same time allow the drum to freely rotate and pass from one compartment into the other. The problems involved with rotary regenerator seals are complex due to the rather large number of variables which the seals must compensate for. The shape of the drum which passes through the seals is not constant either at any one time or over a given length of time. As mentioned above, there is a temperature gradient which runs radially through the drum causing the generally rectangular cross section of the drum to be somewhat distorted. Since the seals separate the two compartments and are thus partially in each, different forces act on different portions of the seals making it necessary to construct the seal so as to compensate for this non-uniform condition. Further, the difference in pressure on either side of a seal causes a turning moment which tends to misalign the seal so that it might gouge into the drum surface.

Notwithstanding the variations which take place in the drum dimensions, the seal, in order to be effective, must provide an opening through which the drum can freely pass without interfering with the rotation of the drum, and preferably without even contacting the drum. By maintaining a finite distance between the drum and the seal, the life of the seal can be greatly extended and thus eliminate a major maintenance problem associated with rotary regenerators. The space between the seal and the drum, however, must be maintained sufficiently small to eliminate any significant loss of sealing efficiency.

Accordingly, it is an object of the present invention to provide an improved rotary regenerator.

It is another object of the present invention to provide a rotary regenerator with a drum which is constructed for long life and efficient operation.

A further object of the present invention is to provide means for supporting the drum effectively under the varied conditions of static and dynamic operation.

Another object of the present invention is to provide improved sealing means for a rotary regenerator wherein the sealing means provide effective separation between regenerator compartments at different pressures without interfering with drum rotation or requiring excessive maintenance.

Still another object of the present invention is to provide seals for a rotary regenerator wherein the seals maintain effective separation between compartments at different pressures while at the same time allowing a drum of variable cross sectional dimensions to pass freely through the seals.

Further and more specific objects and advantages of the invention are made apparent in the following spcification wherein a preferred form of the invention is described by reference to the accompanying drawings.

Figure 1:
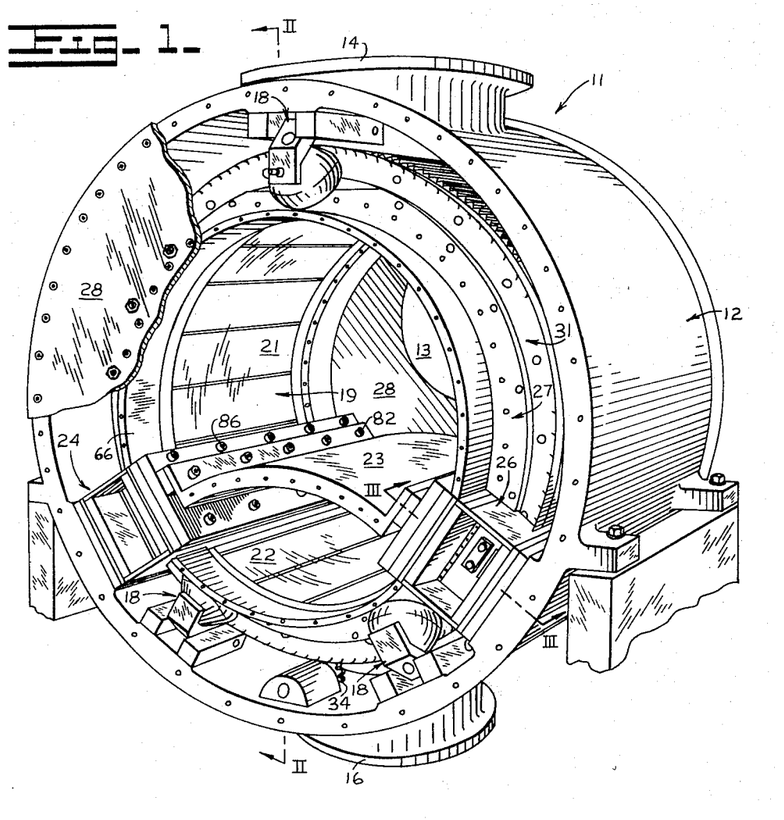
FIG. 1 is an isometric illustration of a rotary regenerator including the improvements of the present invention wherein portions are broken away to reveal inner structure.
Figure 2:
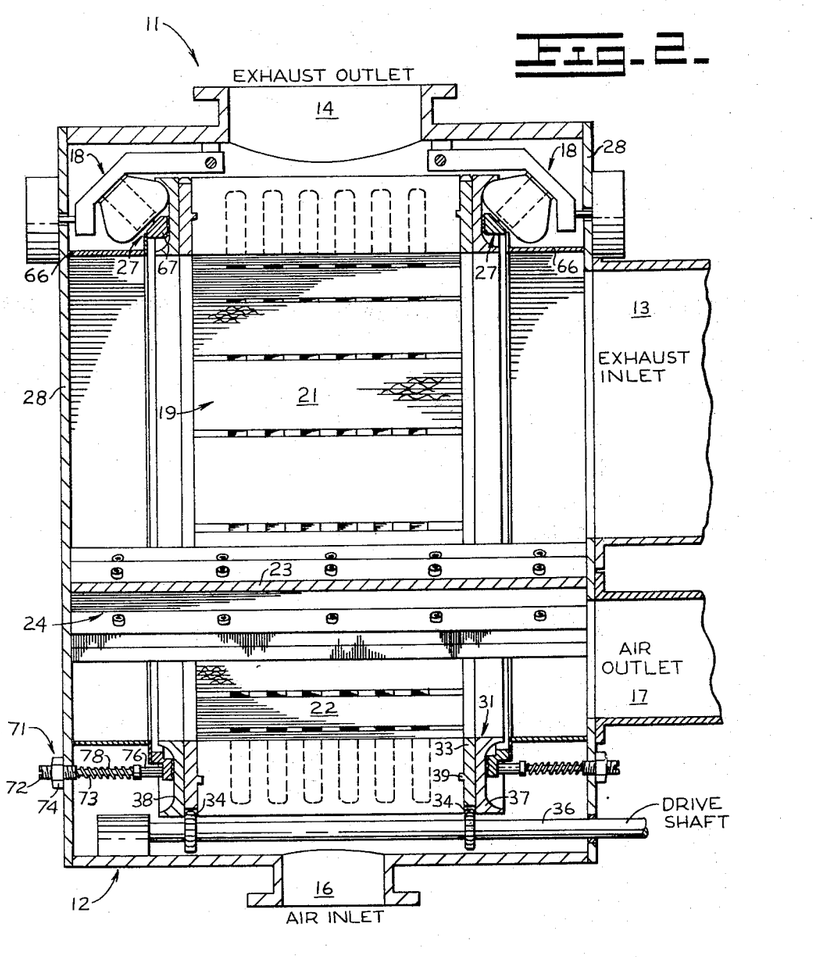
FIG. 2 is a sectional view of the rotary regenerator of the present invention taken along the line II—II of FIG. 1.
Figures 3, 5, 6:
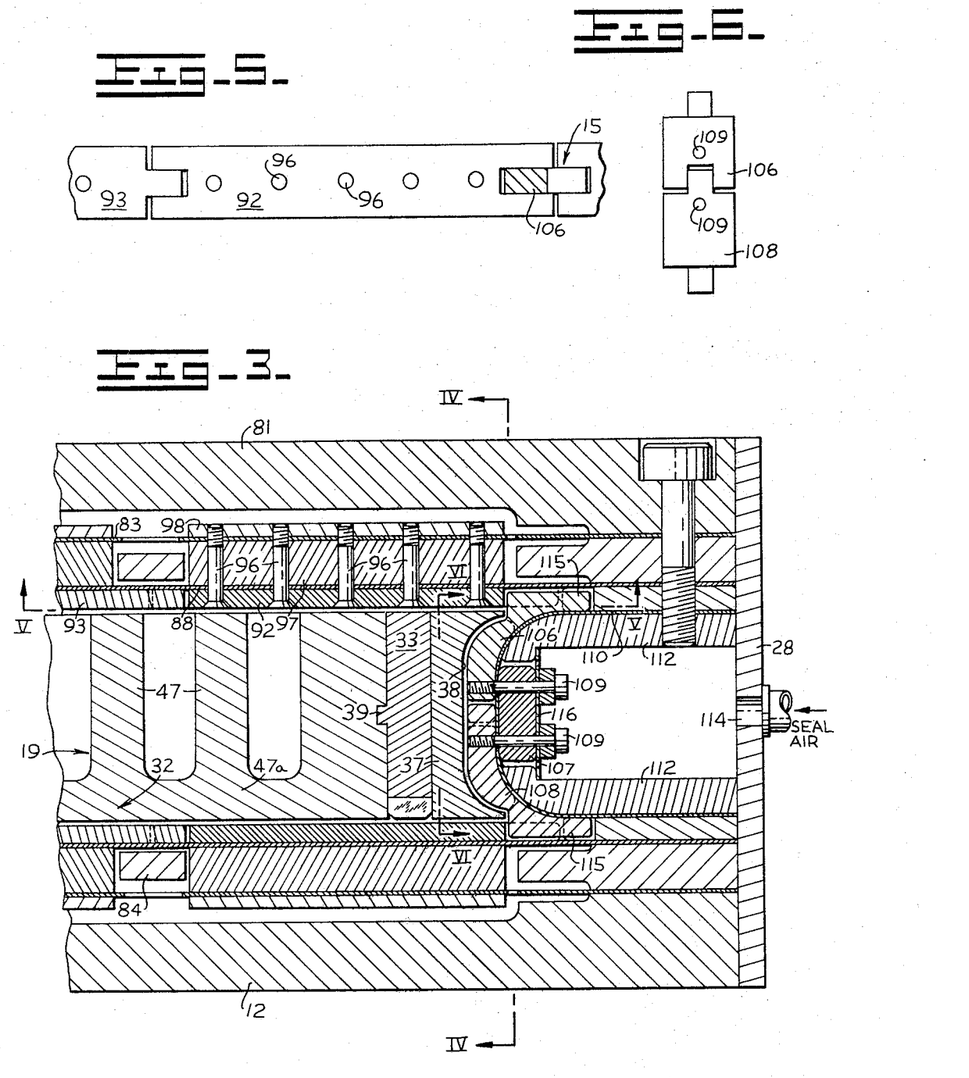
FIG. 3 is an enlarged sectional view taken through the line III—III of FIG. 1 illustrating in detail the end seal structure.
FIG. 5 is a view taken along the line V—V of FIG. 3 illustrating the interlocking nature of the longitudinal seals.
FIG. 6 is a view taken along the line VI—VI of FIG. 3 illustrating the interlocking nature of the end seals.

Referring now to the drawings, primarily FIGS. 1 and 2, the rotary regenerator 11 includes a main cylindrical outer housing 12 having an exhaust gas inlet 13, an exhaust gas outlet 14, a pressurized air inlet 16 and a pressurized air outlet 17. Rotatably mounted concentrically within housing 12 on mounting means 18 is a heat exchanger drum 19. The interior of drum 19 is separated into an upper compartment 21 and a lower compartment 22 by a baffle wall 23 together with sealing means 24 and 26. The ends of the compartments 21 and 22 are sealed by labyrinth seal structure 27 (to be described in detail below) together with housing end cover plates 28.

By virtue of the placement of baffle 23, seals 24 and 26, labyrinth seal structures 27 and end plates 28, exhaust gases entering inlet 13 must pass through the drum 19 in order to reach the outlet 14. Similarly compressed air entering at inlet 16 must pass through the drum 19 in order to reach the air outlet 17. Thus the operation of the regenerator becomes evident; hot, low pressure gas enters inlet 13 and heats the drum 19 as it passes therethrough to leave outlet 14 at a much lower temperature and the relatively cool, high pressure air entering at 16 becomes heated in passing through the drum 19 on its way to outlet 17. Thus it is important for the seals 24 and 26 to limit the leakage of compressed air to a minimum in order to prevent large energy losses, and at the same time the seals must be sufficiently flexible to allow the drum 19 to rotate freely so that portions of the drum are continuously leaving one compartment and entering the other. The effectiveness of the regenerator depends largely on the ability of the drum 19 to absorb a maximum amount of heat from the exhaust gases by cooling the gases almost to inlet air temperature and carry this heat to a compartment 22 where it is given up to the cooler compressed air which is thereby heated almost to exhaust inlet temperature before leaving the drum.

Figure 11:
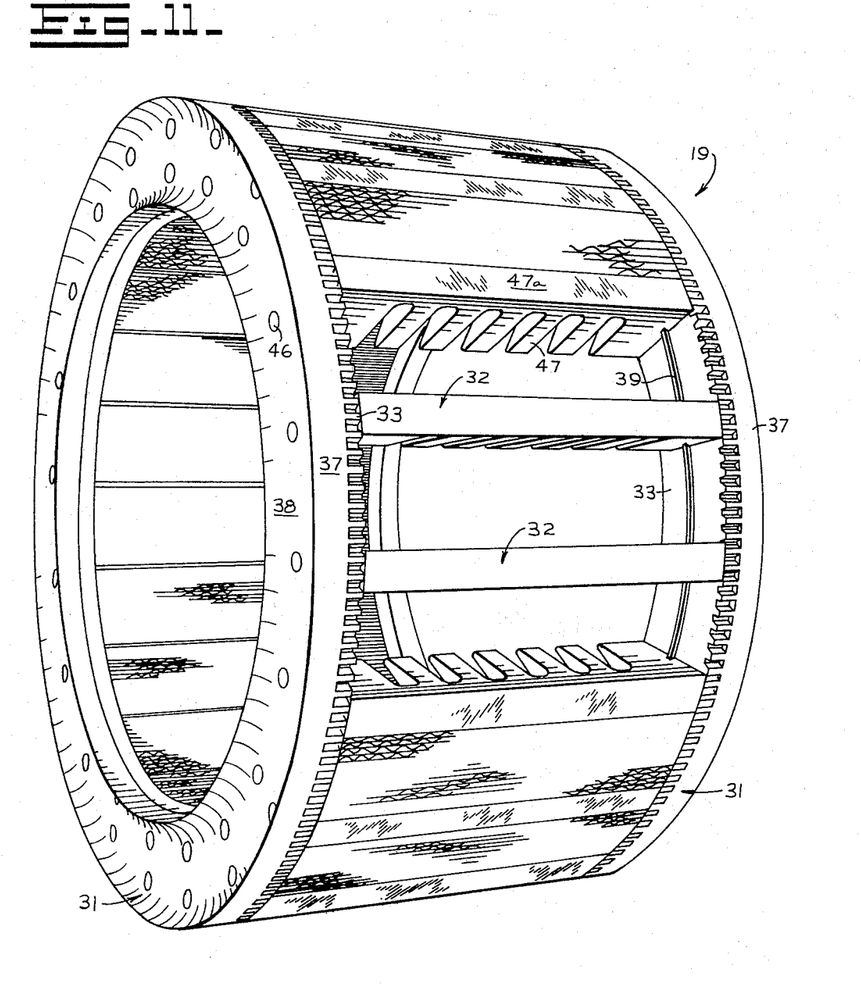
FIG. 11 is an isometric illustration of the drum partially constructed.

Referring now to FIG. 11 along with FIGS. 1 and 2, drum 19 includes a pair of end rings 31 which are maintained at spaced apart locations by spacer members 32. The end rings 31 include inner rings 33 which are notched along their outer circumferences. The notched rings 33 mesh with gears 34 carried by drive shaft 36 thus forming a driving connection through which the drum is rotated. Inner rings 33 are integrallly secured to outer rings 37 which have concave outer lateral surfaces 38 which cooperate with the support means 18 in a manner to be described in detail below.

Figure 7:
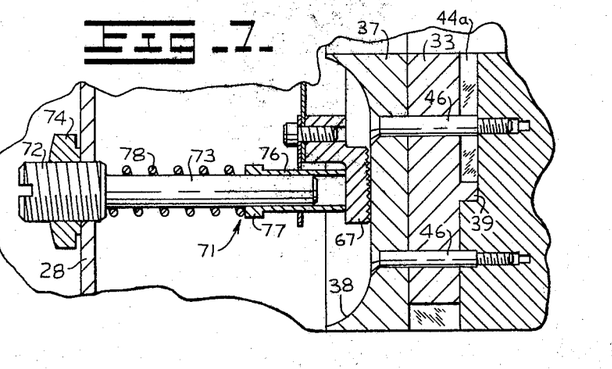
FIG. 7 is an enlarged sectional view of the means provided for adjusting the pressure on a labrinth seal which forms a portion of the present invention.

In constructing the drum 19, the end rings 33 are initially secured together by a single spacer 32. Then a number of generally rectangular thin metal plates 41 (see FIG. 8) are disposed between the rings 33 adjacent the single spacer 32. As most clearly disclosed in FIG. 8 plates 41 include alternate flat plates 42 and corrugated plates 43. Each of plates 42 and 43 has an overall length which is approximately equal to the distance between the inner surfaces of rings 33. Each end of the plates 42 and 43 includes a notch 44 which is disposed to receive one of ribs 39 which are intergral with and extend from the inner lateral surfaces of inner rings 33. When the plates are disposed between the rings 31 and the ribs 39 fit into the notches 44 and the plates are thereby located and retained in a fixed position. When a specified number of plates 42 and 43 have been disposed between the ring members 33 a second spacer 32 is placed between the rings 33 adjacent to the plates 41 and secured in place as by bolts 46. The same procedure is repeated until the last spacer 32 is ready to be put into place. Since sufficient room is not available for the last spacer to be tipped at an angle so as to enable it to pass over rib 39, it is provided with a notch 44a which extends all the way down one side, as shown in FIG. 7. This spacer then can be simply slid into place. Thus the drum includes a series of wedge shaped spacers 32 which are radially directed and evenly spaced around the drum. The spacers are operative to retain the thin heat carrying plates 42 and 43 in place enabling them to form an effective matrix.

As explained above the temperature experienced by the interior of the drum is greater than that experienced by the exterior of the drum. Thus a heat gradient is established through the drum in a radial direction such that the interior portions of the drum tend to expand more than the outer portions. The spacers 32 are generally wedge shaped beams with a series of adjacent U-shaped notches creating finger-like projections 47 all joined to a common member 47a. The wedge shape of the spacers compensates for the geometry of the stacks of matrix sheets which are roughly retangular. The U-shaped slots reduce the tendency of the spacers 32 to bow inwardly under the influence of the considerable temperature gradient from the outside to the inside of the drum. Thus, the drum 19 is a structurally sound member which is capable of absorbing and giving up heat quickly and efficiently with a minimum amount of structure distortion.

Figures 8, 9:
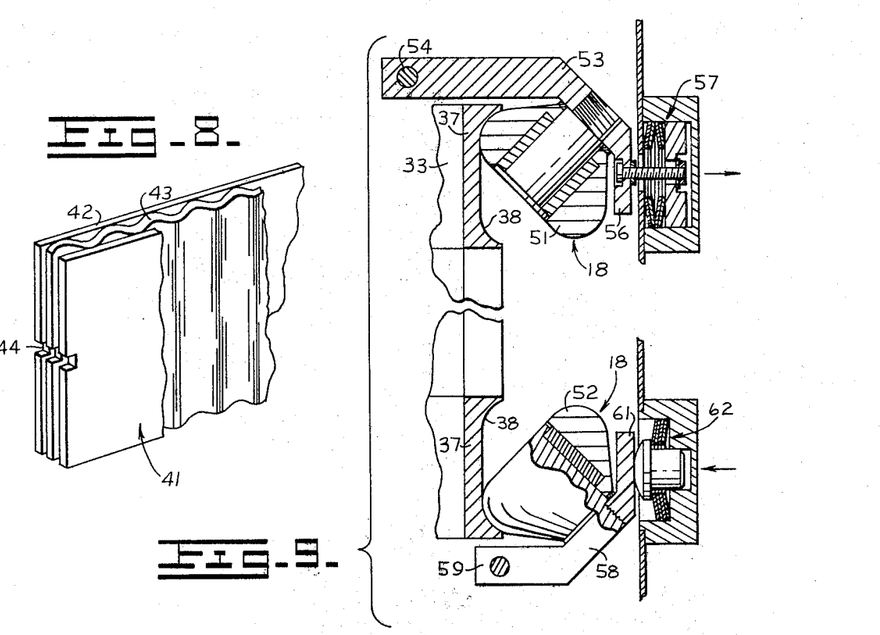
FIG. 8 is an isometric illustration of the drum matrix forming members.
FIG. 9 is an enlarged partially sectioned view of the drum support means.
Figure 10:
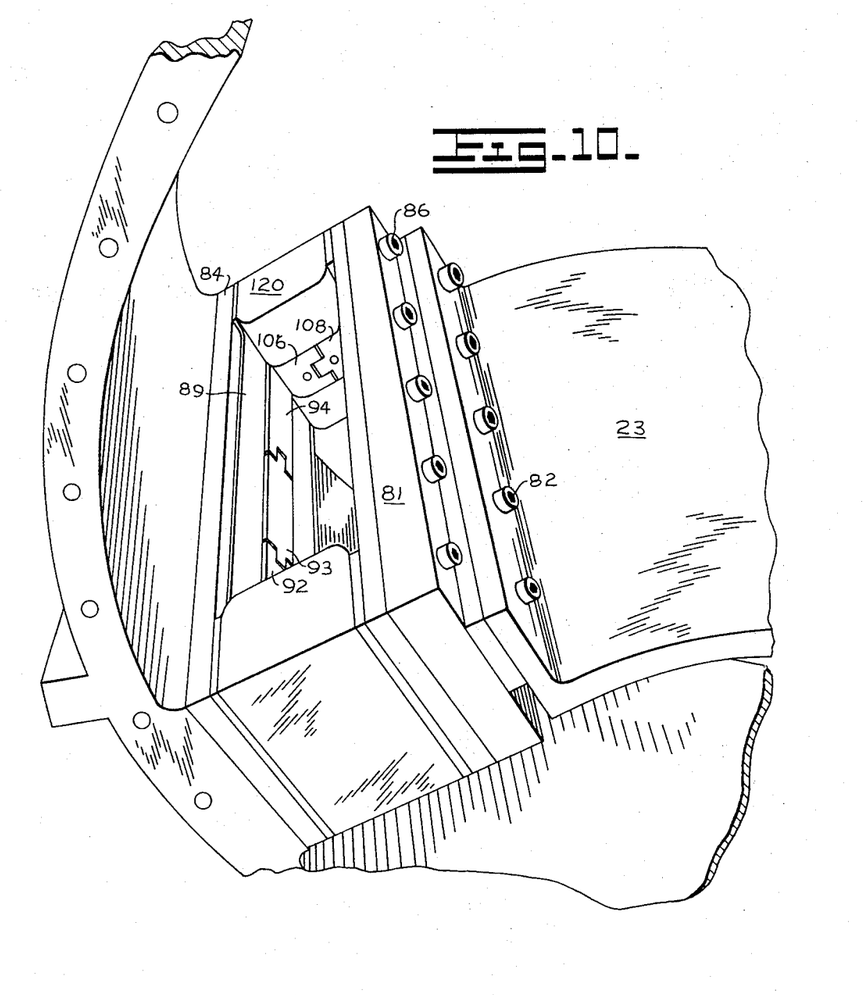
FIG. 10 is an isometric illustration of a seal.

Referring now to FIG. 9 along with FIGS. 1 and 2, the drum 19 is mounted within housing 12 on roller means 18. Roller means 18 include a single upper roller 51 on each side and a pair of lower rollers 52 on each side. Each of rollers 51 is rotatably secured to a lever 53 which is pinned at one end 54 and secured at its other end 56 to a compression spring means 57. The rollers 51 support the weight of drum 19 under static conditions and are urged against the concave outer surface 38 of drum ring 37. The spring means 57 operates to urge lever 53 to rotate upwardly thus maintaining contact between roller 51 and surface 38 at all times.

Each bottom roller 52 is rotatably secured to a lever 58 which is pinned at one of its ends 59 while its other end 61 is acted upon by compression spring means 62. The roller 52, like the roller 51, engages the surface 38 of ring 37 and is maintained in contact therewith by virtue of the compression spring means 62 providing a force on lever 58 tending to rotate it counter-clockwise. The combination of top rollers 51 and bottom rollers 52 provides support means by which the drum can easily rotate and by which the drum is adequately supported both under static and dynamic conditions. The use of compression spring means as described accommodates for changes in dimensions of the drum and housing to assure proper support for the drum at all times.

The surface 38 of ring 37 serves not only as a bearing surface for rollers 51 and 52 but also as a sealing surface in conjunction with the labyrinth sealing structure 27. Referring primarily to FIGS. 1, 2 and 7, an annular ring 66 of a greater diameter than the inner diameter of drum 19 is disposed coaxially with the drum 19 and secured to a labyrinth sealing ring 67 which is urged against the surface 38 of ring 37 by spring means 71. The longitudinal width of annular ring 66 is such that when plates 28 are secured to housing 12 the rings 66 abut the plates 28 forming a seal therewith. Thus, the labyrinth seal means 27 restrict the travel of gases from inlet to outlet to a path which includes the drum 19.

FIG. 7 shows the details of the spring means 71 which urge the labyrinth seal ring 67 into contact with the surface 38. Spring means 71 include a threaded screw head 72 integrally connected to a shaft 73. Screw head 72 is threadably secured into plate 28 and locked by locking nut 74 at a desired penetration through plate 28 depending upon the amount of force desired to be directed against ring 67. Shaft 73 fits into a bearing sleeve 76 which engages the ring 67 at one end and which includes a shoulder 77 at its other end. Shoulder 77 serves as a seat for one end of spring 78 while the screw head 72 serves as a seat for the other end of spring 78. The spring 78 provides a force which acts against the sleeve 77 and urges it against ring 67. The amount of force supplied by spring 78 is dependent upon the distance between the shoulder 77 and the screw head 72 which is adjustable as previously described. Spring means 71 are disposed evenly around the entire periphery of the drum 19 (on both ends) such that the forces supplied thereby are evenly distributed.

The spring means 71 described above includes a compression spring 78 which urges the ring 67 against the surface 38. At those locations around the drum 19 where the air pressure which urges the ring 67 against surface 38 is greater than the air pressure which acts in the opposite direction, it may be necessary for selected springs 78 to be tension springs in order that the ring 67 engage the surface 38 with the desired amount of force. If no provisions were made for relieving a portion of the pressure acting to urge the ring 67 against the surface 38, excessive wear would take place and possible interference with the rotation of drum 19 could result.

The following description of the seals of the present invention is made primarily with reference to FIGS. 1, 3, 4 and 10. Each of the longitudinal seals includes an upper support member 81 to which the baffle wall 23 is secured as by bolts 82. A thin metal diaphragm member 83 mates with the underside of member 81 and is held firmly in place thereagainst by a support member 84 which is held to member 81 by securing bolts 86. The lower surface of member 81 and the upper surface of member 84 include longitudinal recesses which form chamber 87. Due to the recess 87 a portion of diaphragm member 83 is disposed at a distance from the upper and lower surfaces of members 84 and 81, respectively, thus making it possible for diaphragm member 83 to flex in response to appropriate forces. A second diaphragm member 88 is secured to the lower surface of support member 84 and held thereagainst by a pair of spaced apart securing members 89 which are held tightly to member 84 as by screws 91. The central portion of the lower surface of member 84 is somewhat concave such that the mid-portion of diaphragm member 88 is not in contact with the member 84 and thus free to flex under the appropriate conditions. Secured to the lower surface of diaphragm member 88 between securing members 89 are a plurality of sealing shoes 92, 93 and 94 (see FIG. 5). The sealing shoes are secured to the diaphragm 88 as by screws 96 which extend upwardly through the shoes, through diaphragm 88, through a spacer block 97, through upper diaphragm member 83, and thread into an upper securing plate 98. Block 97 extends through a central longitudinal opening 99 in member 84 and secures upper diaphragm member 83 to lower diaphragm member 88. This arrangement of components enables the seal shoes 92, 93 and 94 to move in a direction transverse to their length (toward or away from drum 19) and at the same time resist any tendency to rotate about a longitudinal axis should greater forces be experienced by one edge of a shoe than by the other edge.

The ability of the sealing shoes to resist rotation about their longitudinal axis is a most important part of the present invention due to the fact that the pressures experienced by the shoe vary greatly across the lateral surface of the shoes. One edge of each shoe is exposed to the low pressure, high temperature gases while the other edges are exposed to the high pressure, cooler gases. The differences in pressures on the edges of the shoes become even more acute when a spacer 32 rotates past a sealing shoe since the portions of the shoe adjacent to the spacer experience less of a pressure than those portions which are exposed to the gases.

In order to maintain as close a possible relation between the sealing shoes and the drum 19 without causing actual contact (or causing contact of a very low pressure) pressurized air is admitted to an inlet passage 102 to the chamber 87 where it passes through openings 101 in upper diaphragm 83 and acts on the lower diaphragm 88. The pressurized air causes the diaphragm 88 to bow outwardly so that the shoe 95 approaches the drum 19. By controlling the pressure of the air in chamber 87 the spacial relationship between the sealing shoes and the drum can be accurately maintained. If the drum should make contact with a sealing shoe, the ability of diaphragms 83 and 88 to flex insures that the shoe will not damage the drum or cause excessive wear thereto.

The advantage gained through a plurality of interlocked shoes 92, 93 and 94, as opposed to a single shoe, resides in the ability of each shoe to individually adjust to the axial contour of the drum which, as explained above, may be bowed axially to a varying degree.

Figure 4:
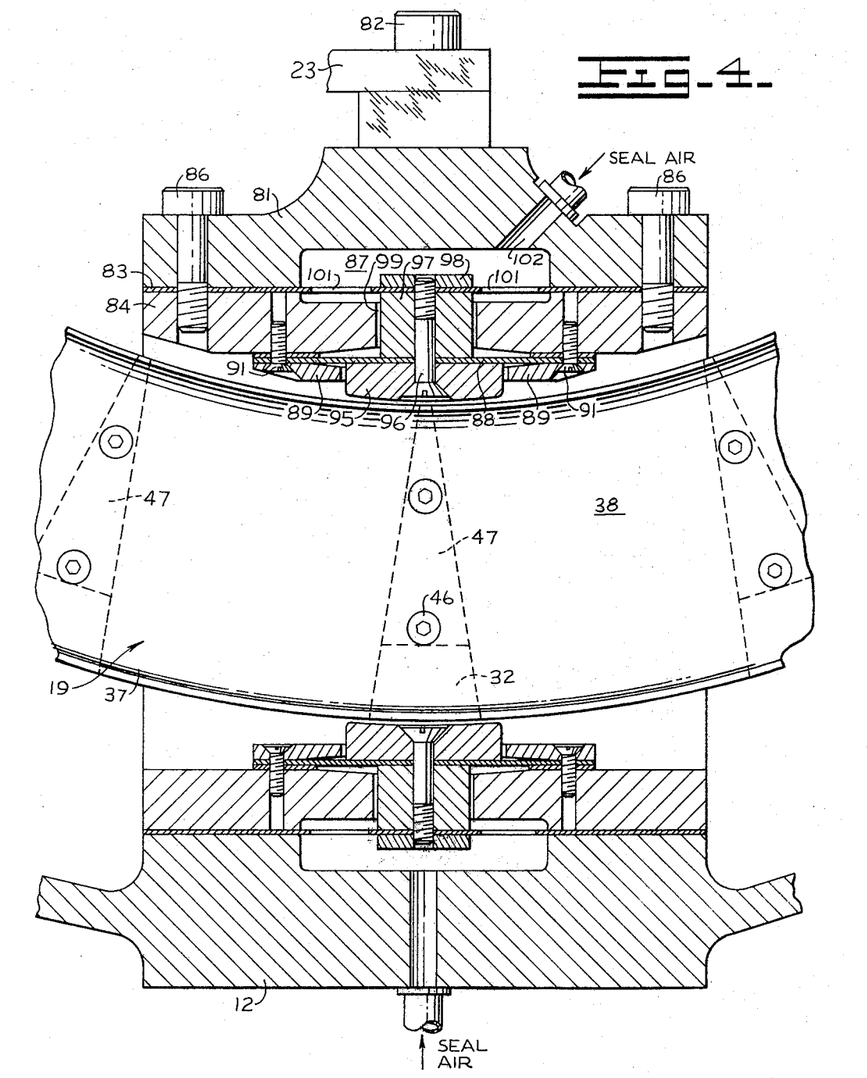
FIG. 4 is an enlarged sectional view taken through the line IV—IV of FIG. 3 illustrating in detail the structure of the longitudinal seals.

The lower portion of the longitudinal seal which is shown in FIG. 4 has not been described in detail since it is substantially identical with the upper portion which has been fully described.

The ends seals each includes a pair of interlocking sealing shoes 106 and 108 (see also FIG. 6) the outer surfaces of which conform to the concave surface 38 of ring 37. The shoes 106, 108 are secured to a U shaped diaphragm 110 which in turn is mounted on holding blocks 112. A pair of cap screws 109 secure the shoes 106, 108, diaphragm 110, a spacer 107 and a holding strap 116 together. Like the longitudinal seal the end seal is thus mounted in such a way as to be somewhat flexible and thus responsive to pressurized air admitted at inlet 114 to flex outwardly toward the surface 38. As indicated generally at 115 the longitudinal seals and end seals join in a tongue and groove connection to minimize air leakage. The above described components of the end seal are mounted in an end seal housing 120 best shown in FIG. 10.

We claim:

1. A rotary regenerator drum comprising in combination;
   a pair of annular end rings;
   a plurality of generally wedge shaped spacer members secured to said end rings whereby said end rings are maintained at spaced apart locations, each of said spacer members comprising a plurality of wedge shaped, finger-like projections held at spaced apart locations by a common support member; and
   a heat conducting matrix secured in the area defined by said rings and spacers.

2. A rotary regenerator drum comprising in combination;
   a pair of annular end rings coaxially disposed in facing relation to one another at spaced apart locations;
   a plurality of generally wedge shaped spacer members secured between said rings at generally equal angular intervals, each of said spacers comprising a plurality of wedge shaped, radially inwardly extending finger-like spaced apart projections all secured to a common support member; and
   a heat conducting matrix secured in each of the spaces formed by adjacent spacer members and said rings.

3. The rotary regenerator drum of claim 2 wherein said matrix comprises a plurality of thin, generally rectangular metal sheets some of which are flat and some of which are corrugated and wherein the flat sheets are all disposed between two corrugated sheets.

4. The rotary regenerator drum of claim 3 wherein said sheets all have notches in their edges which face said rings and said rings each have circular ribs for registering with said notches disposed on the surfaces of said rings which directly face one another.

5. A mounting in a rotary regenerator for a rotating drum of the rotary regenerator wherein the drum is disposed within a housing and is urged upwardly during dynamic operation and urged downwardly during static conditions comprising in combination;

a pair of spaced apart annular rings forming a portion of the rotary regenerator drum and having generally concave lateral surfaces;

a pair of upper rollers secured to the housing, one of said upper rollers engaging the concave surface of each of said rings;

resilient force means associated with said upper rollers urging said rollers generally upwardly against said rings surfaces against the weight of the drum;

two pairs of lower rollers secured to the housing, one of each pair of said lower rollers engaging the concave surface of each of said rings; and resilient force means associated with said lower rollers urging said rollers generally downwardly against said ring surfaces.

6. The mounting means of claim 5 wherein said first named force means is a resilient spring device in tension and said second named force means is a resilient spring device in compression.

7. A seal in a rotary regenerator for keeping separate the compartments of the rotary regenerator through which a drum rotates wherein the compartments have different temperature and pressure conditions comprising in combination;

a generally elongated sealing support member disposed adjacent to a surface of the drum having a centrally located longitudinally extending slot, wherein at least one surface which includes the slot is concave;

a first flexible diaphragm member secured to the concave surface of said support member and disposed to span the centrally located slot;

a second flexible diaphragm member secured to the opposite surface of said support member and disposed to span the slot;

a stabilizing block disposed in the slot and affixed to said first diaphragm members and said second diaphragm;

sealing blocks affixed to said first diaphragm member on its surface remote from said second diaphragm member and adjacent to the drum surface; and means operable to apply a pressure against said first diaphragm member which urges said sealing blocks away from said second support member and into the drum surface.

8. The seal of claim 7 wherein said sealing blocks are joined by a tongue and groove inter-connection.

9. A seal in a rotary regenerator for keeping separate the compartments of the rotary regenerator through which a drum rotates wherein the compartments have different temperature and pressure conditions, comprising in combination;

a first flexible diaphragm member disposed in close proximity to a surface of the drum;

a second flexible diaphragm member disposed at a distance from said first diaphragm member and essentially parallel thereto;

a support block disposed between and affixed to both said first and said second diaphragm members;

a sealing block affixed to said first diaphragm member on its surface remote from said second diaphragm member and adjacent to the drum surface; and means operable to establish a desired pressure against said first diaphragm in a direction which urges said sealing block away from said second diaphragm and into the drum surface.

References Cited by the Examiner

UNITED STATES PATENTS

| 2,678,193 | 5/1954 | Stevens et al. | 165—9 |
| 3,083,762 | 4/1963 | Kolthoff et al. | 165—7 X |
| 3,204,969 | 9/1965 | Williams | 165—9 X |
| 3,216,487 | 11/1965 | Gallagher | 165—9 |

FOREIGN PATENTS 147,208   7/1952   Australia.

MEYER PERLIN, *Primary Examiner.*

ROBERT A. O'LEARY, *Examiner.*

A. W. DAVIS, *Assistant Examiner.*